Sept. 7, 1965
J. D. FANN
3,204,821
MIXING AND MEASURING DEVICE
Filed June 10, 1963
2 Sheets-Sheet 1
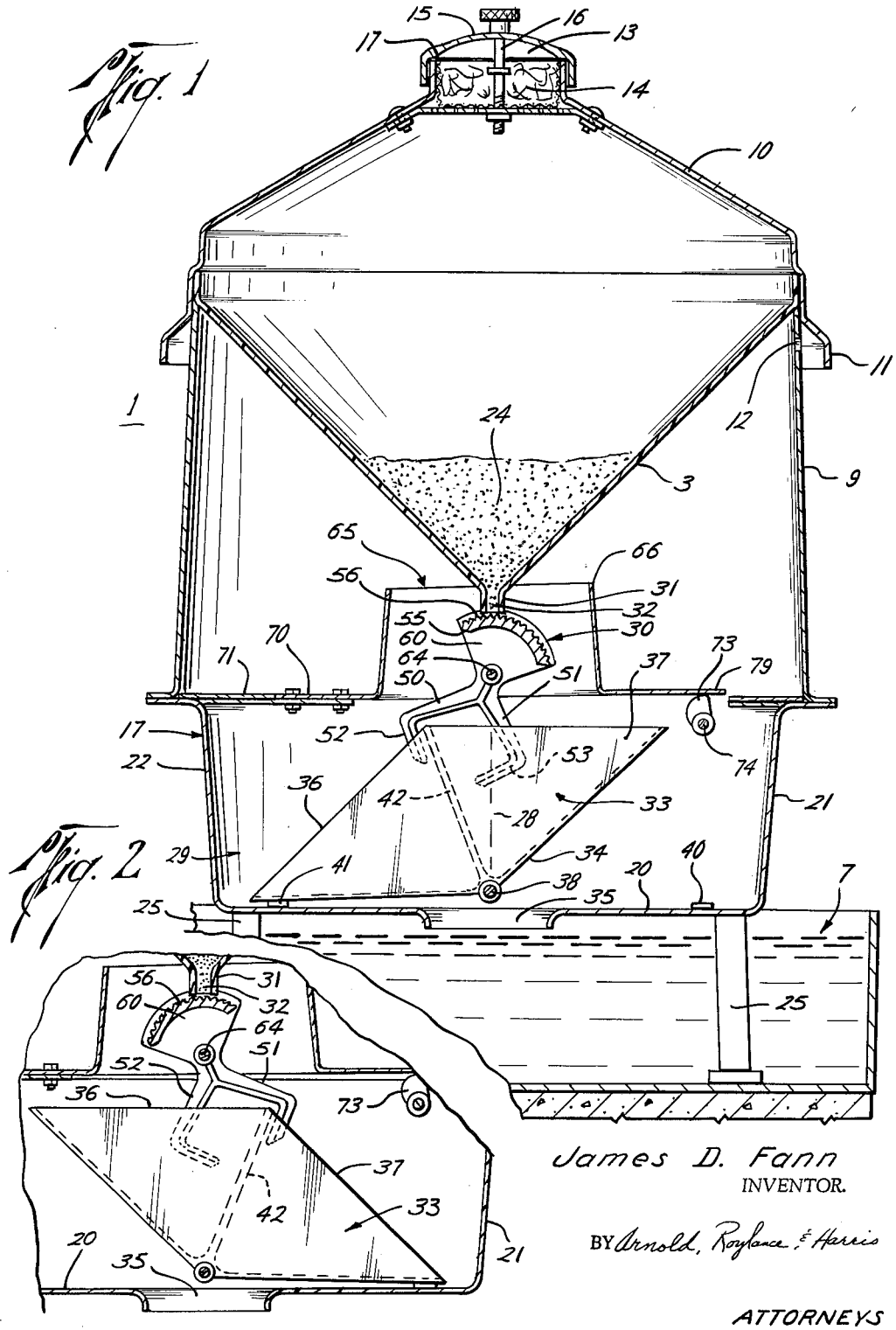
James D. Fann
INVENTOR.
BY Arnold, Roylance & Harris
ATTORNEYS

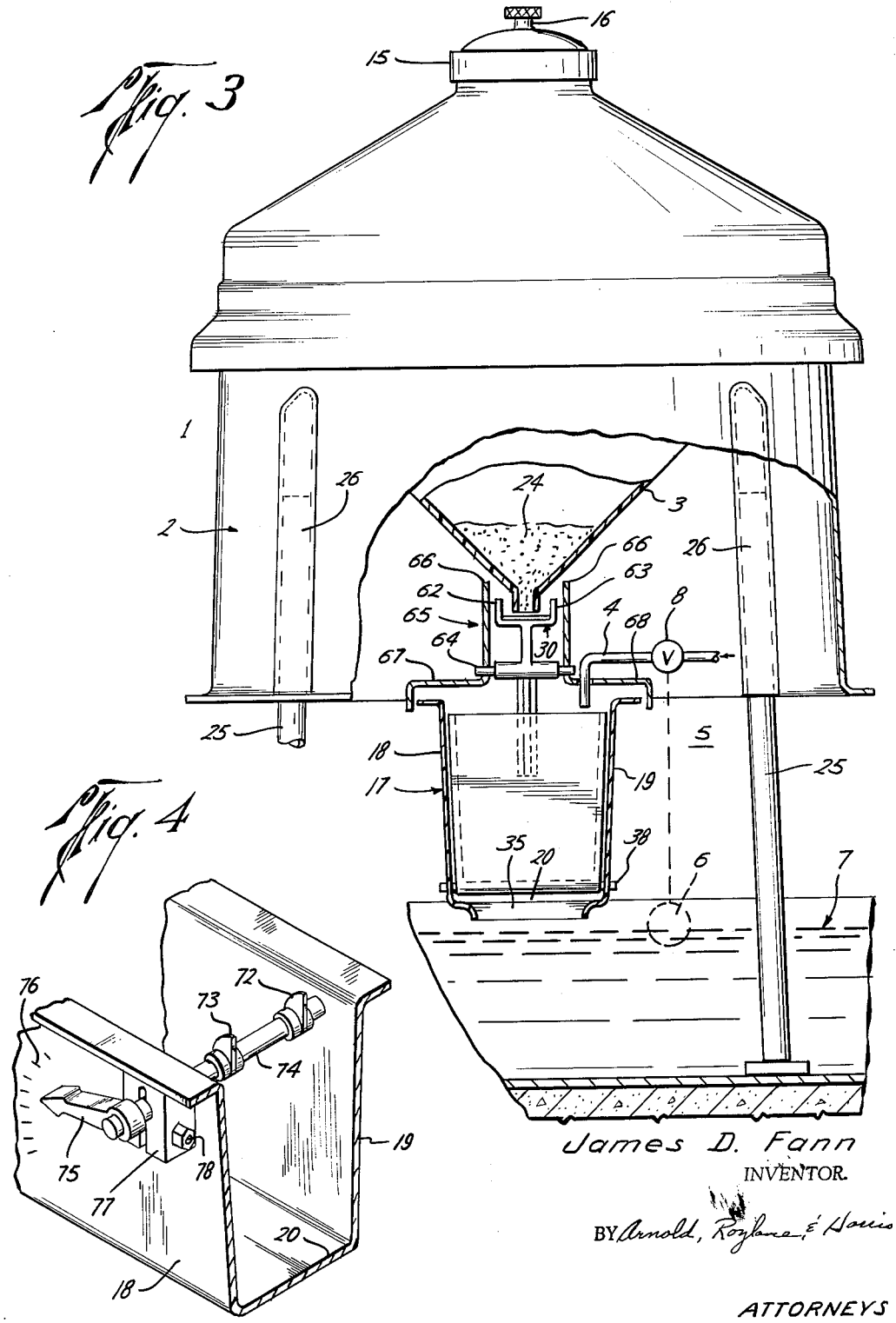

United States Patent Office 3,204,821
Patented Sept. 7, 1965

3,204,821
MIXING AND MEASURING DEVICE
James D. Fann, P.O. Box 6101, Houston, Tex.
Filed June 10, 1963, Ser. No. 286,742
9 Claims. (Cl. 222—41)

The present invention relates to devices for mixing a material, generally a chemical, with a fluid such as water. More particularly, the present invention relates to a watering trough for animals that automatically mixes a prescribed portion of a health enriching medicine for animals with water as the water supply in the trough is replenished.

While devices for mixing one or more materials with a fluid are well known, the design of each device is dictated to a great extent by the nature of the material that is added to the fluid. Where the material is in the form of large grains and is stored under controlled conditions, the problem of precisely controlling the quantity of added material is not too difficult.

The present invention, however, concerns itself with handling materials that have rather unique characteristics and are not necessarily stored under favorable conditions, necessitating special precautions to insure an accurate and complete mixing of the material with a fluid.

Consider, for example, the problems that can arise with a material that has a consistency almost like water, i.e., that flows very easily, and is hydroscopic—exhibits a high degree of water absorption. Conventional trapdoor type feed mechanisms prove very impractical with this type of material. In the first place, the material flow is hard to control. Secondly, the hard coating formed by the material after the absorbed water evaporates can change the amount of material dispensed from the feed mechanism.

An illustration of the nature of the aforementioned problems is conveniently found in considering a watering trough that adds phosphate to water. Phosphate is important to the full growth of cattle and the supply of this chemical is usually supplemented in the cattle's food by grass fertilizing with phosphate or by adding it to the drinking water. The amount of phosphate needed varies from region to region and depends on the time of year. If too much phosphate is added the cattle may be injured, and if too little phosphate is added, the advantage of supplementing the supply is lost. Also, if the phosphate is not adequately mixed the cattle can be seriously injured.

A typical watering trough is located out on the range and is self-tending, automatically supplying water to fill up a reservoir and adding a proper amount of phosphate. The storage conditions on the range are far from controlled, except that a high humidity can be counted on, especially in the Southwest part of the United States. The moisture in the air condenses on the storage container and feed mechanism, turning the phosphate into a hard coating that prevents accurate dispensing. If a watering trough is not used regularly, and this is the typical case, the feed mechanism can become completely inoperative.

Since a range watering trough cannot be given frequent maintenance, it is evident that a self-tending watering trough that can handle materials such as phosphate is an important improvement.

The present invention provides an apparatus capable of accurately mixing a material, such as phosphate, with a fluid even when operated infrequently.

A further object of the invention is to provide a feed mechanism that minimizes the effect of clogging due to hydroscopic chemicals.

A further object of the invention is to insure complete mixing of a material with a fluid, utilizing a simple and reliable method and mechanical construction.

Other objects of the present invention will become apparent from a reading of the following description and reference to the attached drawings.

Briefly, one form of the present invention can be described as a device for mixing a fluid with a prescribed proportion of a material. The device includes a storage container for the material with an exit opening and a feed mechanism including a feed member having a knurled face disposed opposite the exit opening. Means is provided to move the face across the opening to dispense a portion of the material. Means is provided for receiving and mixing the dispensed material with a measured quantity of fluid. Additional features of construction includes means for adjusting the quantity of material dispensed. The feed member can have oscillating motion, controlled by a tilting bucket having two receptacles that alternately receive a dispensed material and a preselected quantity of fluid. The material and fluid are mixed in the tilting bucket and are further mixed in a mixing tray disposed below the tilting bucket before passing to a reservoir.

A description of a preferred embodiment of the present invention is illustrated in the attached drawings as listed below:

FIG. 1 is a cross-sectional view in elevation of one embodiment of a self-tending watering trough constructed in accordance with the present invention;

FIG. 2 is a fragmentary view of the embodiment shown in FIG. 1, illustrating the feed member in the alternate position;

FIG. 3 is an elevation view, partially in section, of a self-tending watering trough looking 90 degrees from the view shown in FIG. 1; and FIG. 4 is a fragmentary view illustrating one embodiment of means for adjusting the position of the carriage that supports the feed member and for indicating the proportion of the quantity of fluid and material mixture.

Before commencing a detailed description of the preferred embodiment, it must be recognized that the features of the present invention may be incorporated in a number of arrangements and that these changes and modifications are to be considered as part of the present invention, limited only by the appended claims.

As mentioned previously, a watering trough is frequently located out on the range and must require little, if any, maintenance for operating periods of over 6 or more months. In a range installation the fluid source for the watering trough usually is derived from a spring and the fluid flows by the natural pressure of the spring or by means of a windmill driven pump. Obviously, many types of pumping means can be used and this aspect is not part of the present invention.

Illustrated in FIGS. 1 thru 4 is a complete watering trough installation 1, suitable for range use, including dispensing device 2 that stores the chemical material, such as phosphate 24, in a hopper 3. Water enters through pipe 4 under sufficient pressure and is turned on and off by a level control means 5 having a float 6 disposed in the reservoir 7. The water flow into the reservoir 7 is turned on and off in response to the level control means 5 through a valve 8, such that when the level drops below a certain point the valve is opened and when the water level reaches a certain height the valve is shut off. Such level control means are well-known in the prior art and any one of a number of types may be used with the present invention to maintain the water level in the reservoir 7.

Protection from the weather is provided for hopper 3 by a tubular side cover 9 and a top 10 having a downwardly extending skirt 11 that overlies an air vent 12.

The top 10 has an entrance port 13 through which phosphate 24 is poured into hopper 3 through a screen 14. The entrance port 13 is closed by a cap 15, secured by means of bolt 16 against rubber gasket 17 to form an airtight closure. Attached to the lower end of cover 9 is a basin 17 having opposite vertical side walls 18 and 19 and a bottom 20 and opposite end walls 21 and 22 that together form a mixing tray 29. The juncture between the cover 9 and basin 17 is complete and substantially airtight.

The dispensing device 2 is in fluid communication with reservoir 7, either by a pipe, or as shown in FIG. 1 by standing in the reservoir 7 on tubular legs 25 and having an outlet 35 in basin 17. There are (only two are shown in FIGS. 1 and 3) four equally spaced legs 25. Legs 25 may be separated from the cover 9 by withdrawing them from their respective tubular slots 26 on side cover 9.

The present invention utilizes a unique feed mechanism 30 that substantially eliminates any problem due to the formation of hard phosphate coatings. The feed mechanism 30 is disposed opposite the exit opening 32 of the hopper 3 and is arranged to move thereacross. The feed mechanism 30 has a knurled face 55, a term which is used herein to indicate a rough surface having ridges or the like. As the knurled face 55 moves in one direction a quantity of the phosphate is dispensed and any hard coating that may have formed at the exit opening or on the feed mechanism 30 is knocked off. The dispensed phosphate falls into a receptacle 33 where water is mixed therewith and the water is delivered to reservoir 7.

Another aspect of the invention is that the feed mechanism 30 may move back and forth across the exit opening 32 dispensing precise quantities of the material into separate receptacles 36 and 37 for opposite directions of movement. The water is mixed with the dispensed phosphate in the receptacles 36 and 37 and delivered to reservoir 7.

An additional aspect of the invention is that following the first mixing of the material with the fluid in the receptacle 33, the water and phosphate are further mixed by dumping the receptacle onto mixing tray 29 before delivery to reservoir 7.

The above features are illustrated in the embodiment described in the present application by way of example only, first directing attention to FIG. 1, wherein the feed mechanism 30 is disposed at the bottom of the downwardly extending hopper nozzle 31 opposite nozzle opening 32. The material dispensed by the feed mechanism 30 walls into a conventional tilting bucket 33 pivotally mounted at the vertex of its V-shaped base on a shaft 38 rotatably mounted in side walls 18 and 19 of basin 17, as best shown in FIG. 3, for oscillatory movement as will be described hereinafter. The second mixing stage is provided by the mixing tray 29.

The tilting bucket 33 consists of two receptacles 36 and 37 separated by a partition 42, each of which can be located either in an upright position or in a dumping position. In FIG. 1, receptacle 36 is in the dumping position and receptacle 37 is in the upright position. In FIG. 2, the relationship is reversed. Appropriate shock absorbing means 40 and 41 may be included to cushion the fall of the bucket 33 to the dumping positions.

The bucket 33 is so disposed in relation to the fluid pipe 4, referring to FIG. 1, that the fluid is aimed directly at the vertex of the receptacle in the upright position, as indicated by dash-dot line 28, to afford maximum mixing and reduce splashing as much as possible.

In addition to providing the initial mixing of the material and fluid, the tilting bucket 33 in combination with the pressurized fluid passing through pipe 4, serves to oscillate the feed mechanism 30 to establish a controlled path of movement in synchronism with the mixing operation, where at all times the fluid is being mixed with phosphate in one receptacle and a mixed batch is being dumped for further mixing in tray 29.

The oscillatory motion of the feed mechanism 30 is controlled by the depending arms 50 and 51 having right angle extensions 52 and 53 that contact the partition 42 as the bucket is tilted back and forth.

The part of the feed mechanism 30 that actually dispenses the material is formed by a curved feed member 55 having a convexed side that faces the exit opening 32 of nozzle 31. The member side has the knurled surface 56, sufficiently rough to engage and carry away any formation of a hard coating at the exit opening or on itself as it passes back and forth under the nozzle 31. The member 55 is part of a sector-shaped frame 60 which includes the depending arms 50 and 51 and upright flanges 62 and 63 (see FIG. 3) that form a channel to guide the dispensed phosphate to the respective receptacles.

The feed mechanism frame 60 is pivotally mounted on shaft 64 which in turn is rotatably supported on a carriage 65 having a four-sided baffle 66 surrounding feed mechanism 30, open at the top and bottom and with flaps 67 and 68 that overlie the top of basin 17 to confine the splashing water.

In addition to the need for precisely controlling the quantity of phosphate dispensed, as the present invention does, it is important to be able to adjust the amount of phosphate dispensed to meet a particular prescription for the water. The amount of phosphate added to drinking water will depend on the location where cattle are grazing and the time of year.

Accordingly, the present invention includes the concept of having provision for adjusting the proportion of phosphate-to-water without losing any of the unique features heretofore described.

The adjustment feature is accomplished by moving the feed mechanism 30 with respect to the hopper exit opening 32, the closer the spacing the less material being dispensed and the greater the spacing the more material being dispensed. In the illustrated embodiment, the feed mechanism frame 60 can be moved up or down, as viewed in FIG. 1, since the carriage 65 is supported only at one end 70 by means of a bracket 71 attached to the basin 17 at the juncture with the cover 9. The carriage 65 is in effect suspended at end 70 and the opposite end 79 is raised or lowered by cams 72 and 73 rotated by shaft 74, which are mounted in bottom basin side walls 18 and 19 (see FIG. 4) to force the unsupported end 79 of carriage 65 upward, or downward, and thereby alter the spacing between the knurled face 56 and the nozzle exit opening 32. The shaft 74 may include a suitable indicator arm 75 and a calibrated scale 76 (FIG. 4) graduated to indicate proportions of phosphate-to-water that can be furnished. The shaft 74 may be retained in place by a clamp 77 which is locked by means of bolt 78.

Before considering an operating cycle of the dispensing device 2, it must be mentioned again that such an installation would normally be found out on the range where little or no maintenance can be provided. Thus, it is important that the dispensing device 2 be very reliable. In operation, the level in the reservoir 7 drops below a certain point; the liquid level control means 5 opens the valve 8 and fluid commences to fill up the receptacle 34 assuming that the parts are in the relationship shown in FIG. 1. Previous to the time that the receptacle 34 starts to fill, a precise quantity of material was dispensed therein by the movement of the feed mechanism 30 to the upright position, as illustrated in FIG. 1, having rotated clockwise as viewed in FIG. 1.

The water mixes with the phosphate in receptacle 34, the mixing being especially enhanced by the fluid from pipe 4 hitting the lowest point of the receptacle 34 at the bottom vertex. When the amount of fluid in receptacle 34 reaches a certain weight the bucket 33 will tilt, dumping its contents onto the mixing tray 29, against the end wall 21 and bottom 20, for further mixing of the phosphate and water. The water then falls through the outlet 35 into reservoir 7.

At the same time that the receptacle 34 is dumping, receptacle 36 has moved to the upright position and feed mechanism frame 60 has been rotated to the position indicated in FIG. 2. During the rotation of feed mechanism frame 60, the feed member 55 has dispensed a precise quantity of phosphate into receptacle 36 and fluid from pipe 4 will commence to flow into receptacle 36 to mix with the dispensed phosphate. Then receptacle 36 dumps and the cycle repeats itself until the liquid in the reservoir 7 reaches a level where level control means shuts off valve 8.

It is apparent that the operation of the described embodiment is simple, reliable, and significantly overcomes the problems inherent with the use of certain hydroscopical free flowing materials, such as phosphate, in a dispensing device that is, of necessity, disposed in a location where it must be essentially self-tending and trouble-free.

While materials for the various parts of the specific embodiment have not been mentioned, it has been found very practical to construct a large number of the parts from fiber glass, including the cover 9, hopper 3, top 10, carriage 65 and basin 17. The feed mechanism frame 60, including the member 55 can be constructed of bronze. Obviously, other materials may be used without departing from the basic teaching of the present invention.

It will be understood that the disclosure of the above described embodiment of this invention is made in compliance with the patent laws and that the appended claims are to be construed as broadly as the prior art will permit.

I claim:
1. In a device for treating a fluid with a prescribed proportion of a solid material, the device including a storage container for the material with an exit opening, the improvement comprising:
   a feed means including a movable feed member having a knurled face disposed opposite said opening;
   means for receiving and mixing the dispensed material with a measured quantity of a fluid; and
   means operatively connected with said receiving means for moving said feed member to pass said face across said opening to dispense a portion of said solid material.
2. The device as described in claim 1 wherein:
   said feed member face is convex and said feed member pivots to move back and forth across said opening.
3. A fluid treating device, comprising:
   a hopper for storing a solid material having a downwardly extending open ended nozzle
   a feed mechanism comprising,
      a feed member disposed in spaced relation below said nozzle and having a knurled face adjacent the open end of said nozzle to control the flow of the solid material from said hopper;
   means supporting said feed member for movement back and forth across the nozzle opening;
   means for receiving the solid material dispensed by the movement of said feed member in one direction in a first receptacle, and receiving the solid material dispensed by the movement of said feed member in the opposite direction in a second receptacle;
   means operatively connected with said first and said second receptacles for oscillating said feed member back and forth across the nozzle opening;
   means for mixing in said first and second receptacles the dispensed material with a prescribed amount of fluid; and
   means for emptying said receptacle into a reservoir following mixing of the fluid and dispensed material.
4. A device as described in claim 3, wherein:
   means is provided for adjusting the spacing between said nozzle and said knurled face of said feed member.
5. The device as described in claim 3, wherein:
   said receptacles are dumped into a tray for further mixing of said solid material and fluid before reaching the reservoir.
6. A device for automatically mixing a prescribed proportion of a chemical with drinking water comprising:
   a storage housing including a hopper having a downwardly extending open ended nozzle at the bottom;
   a carriage supported at one end from said storage housing and having the opposite end suspended adjacent said nozzle open end;
   a feed member pivotally mounted from said carriage and having a convex face disposed opposite and in spaced relation from the nozzle open end for movement back and forth across the nozzle open end;
   means supported by said storage housing for adjusting the elevation of said carriage suspended end and thereby alter the spacing between said nozzle open end and said feed member face to control the flow of chemical from said hopper;
   a tilting bucket having first and second receptacles pivotally supported from said storage housing below said feed member;
   a pipe for supplying a fluid to the receptacle in the upright position;
   linkage means cooperating with said feed member and bucket to rotate said feed member in one direction when the bucket tilts to dump said first receptacle in the opposite direction and thereby feed a prescribed quantity of material from said hopper to said second receptacle, and to rotate said feed member in one opposite direction when said second receptacle dumps and thereby feed a prescribed quantity of material to said first receptacle, the oscillating movement of said feed member and tilting bucket continuing until the water from said pipe is shut of; and
   a reservoir receiving the dumped water mixed with the chemical from said receptacles.
7. The device, as described in claim 6, further comprising:
   a tray disposed under said tilting bucket to receive the dumped water and provide further mixing, said tray having an outlet to said reservoir.
8. The device, as described in claim 6, wherein:
   said carriage includes a baffle that surrounds said nozzle and at least partially encloses said feed member, and includes side flaps that substantially contain the splashing from said tilting bucket; and
   said adjusting means for said carriage is a cam assembly mounted on a shaft supported by said storage housing and being provided with a shaft lock and indicator to set the proportion of chemical to be mixed with the water.
9. The device, as described in claim 6, further comprising:
   fluid level responsive means disposed in said reservoir to cut off the flow of water from said pipe when the level reaches a predetermined height and to commence fluid flow to said tilting bucket when the reservoir level goes below a predetermined level.

References Cited by the Examiner

UNITED STATES PATENTS

| | | | |
|---|---|---|---|
| 1,046,437 | 12/12 | Butler | 222—57 |
| 1,929,693 | 10/33 | Jones et al. | 222—57 |
| 2,243,233 | 5/41 | Volk | 222—414 X |
| 2,317,838 | 4/43 | West et al. | 222—353 X |
| 2,778,536 | 1/57 | Graves et al. | 222—363 X |

FOREIGN PATENTS 28,480    12/56    Finland.

LOUIS J. DEMBO, *Primary Examiner.*